(12) United States Patent
Humphrey et al.

(10) Patent No.: US 8,395,917 B2
(45) Date of Patent: Mar. 12, 2013

(54) REDUNDANT PARALLEL NON-ISOLATED INPUT CONVERTERS

(75) Inventors: Daniel Humphrey, Houston, TX (US); Mohamed Amin Bemat, Cypress, TX (US); Mark Isagani Bello Rivera, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 387 days.

(21) Appl. No.: 12/817,750

(22) Filed: Jun. 17, 2010

(65) Prior Publication Data
US 2011/0310647 A1 Dec. 22, 2011

(51) Int. Cl.
*H02M 7/02* (2006.01)
(52) U.S. Cl. .............................................. 363/67
(58) Field of Classification Search ........ 363/65, 363/67–70; 307/44, 64, 65, 82, 86, 87
See application file for complete search history.

(56) References Cited

U.S. PATENT DOCUMENTS

| | | | |
|---|---|---|---|
| 5,894,413 A | 4/1999 | Ferguson | |
| 5,923,549 A * | 7/1999 | Kobayashi et al. | 363/65 |
| 6,614,671 B2 * | 9/2003 | Thrap | 363/67 |
| 6,639,329 B2 * | 10/2003 | Chan et al. | 307/29 |
| 7,443,055 B2 | 10/2008 | Pracht et al. | |
| 7,980,905 B2 * | 7/2011 | Rembach et al. | 440/6 |
| 7,992,027 B2 * | 8/2011 | Suzuki et al. | 713/330 |
| 8,053,927 B2 * | 11/2011 | Hjort et al. | 307/64 |
| 8,242,704 B2 * | 8/2012 | Lethellier | 315/276 |
| 2011/0310646 A1 * | 12/2011 | Humphrey et al. | 363/126 |

OTHER PUBLICATIONS

Zhang, Di, et al, "Internal Fault Detection and Isolation for Paralleled Voltage Source Converters", IEEE, © 2009, pp. 833-839.

* cited by examiner

*Primary Examiner* — Adolf Berhane

(57) ABSTRACT

A redundant AC-DC power supply system and method is disclosed. A first AC-DC power converter is configured to generate a first output voltage and a first relay is configured to selectively couple and decouple the first AC-DC power converter to an output of an output circuit. A second AC-DC power converter is configured to generate a second output voltage. A second relay is configured to selectively couple and decouple the second AC-DC power converter to the output. A controller is configured to operate the first and second AC-DC power converters and the first and second relays to provide redundant sources of power for the output and to mitigate circulating current flow between the first and second AC-DC power converters.

15 Claims, 7 Drawing Sheets

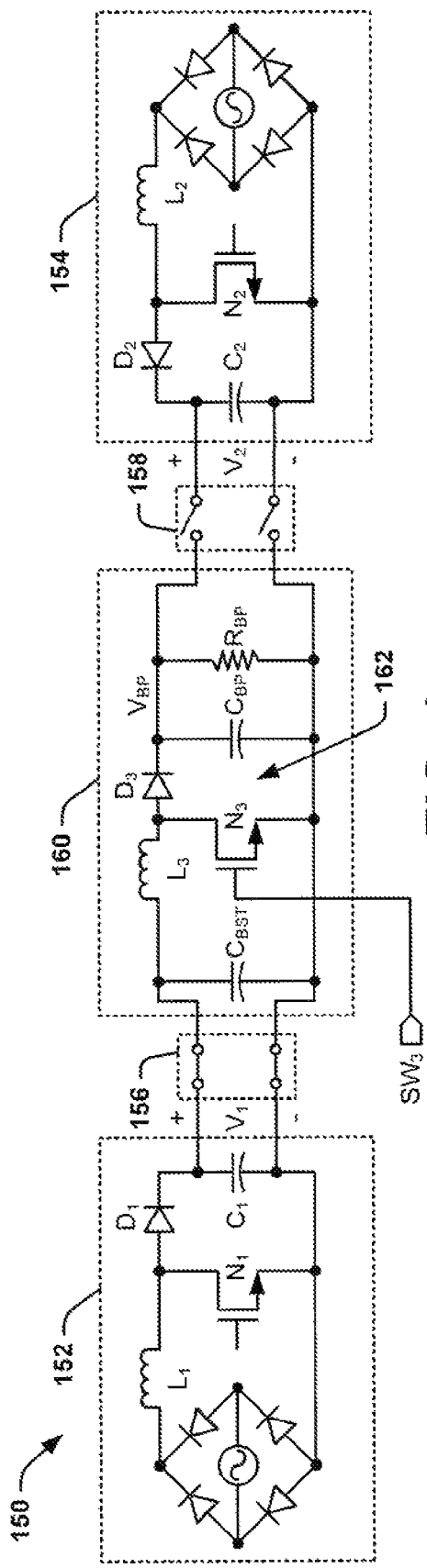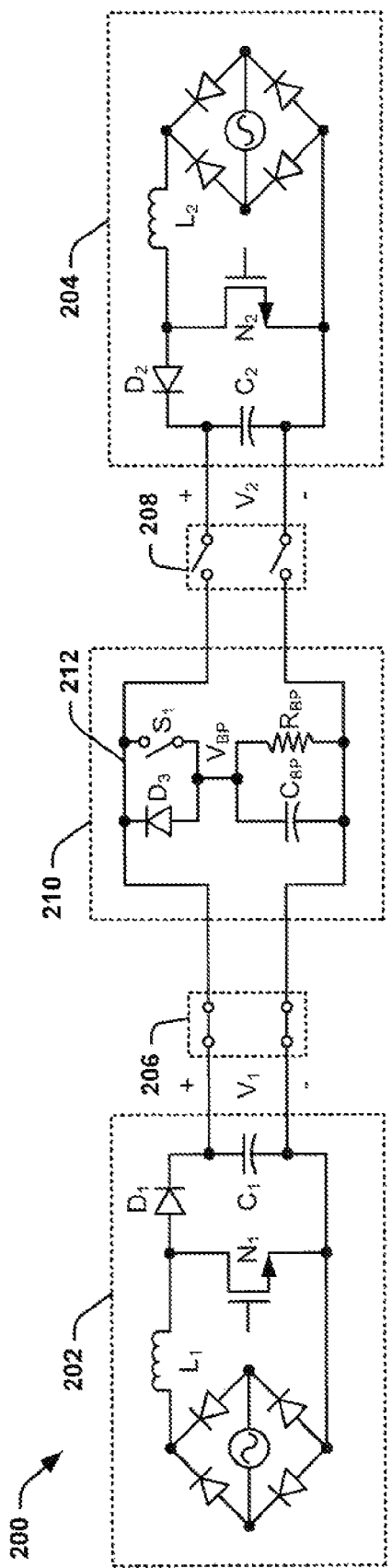

REDUNDANT PARALLEL NON-ISOLATED INPUT CONVERTERS

BACKGROUND

A redundant power supply system can be implemented to provide power to a load from parallel power supplies. In a redundant power supply system, if one of the associated parallel power supplies fails or becomes faulted, then another of the parallel power supplies can continue to provide power to the load. However, with respect to non-isolated AC-DC power converters, common nodes between input sources can result in circulating current between the power converters. The circulating current can result in undesirable operating conditions, such that the parallel connection of the non-isolated AC-DC power converters causes an inoperable redundant power supply system.

BRIEF DESCRIPTION OF THE DRAWINGS

FIG. 4 illustrates another example embodiment of a redundant power supply system.

FIG. 5 illustrates another example embodiment of a redundant power supply system.

DETAILED DESCRIPTION

Figure 1:
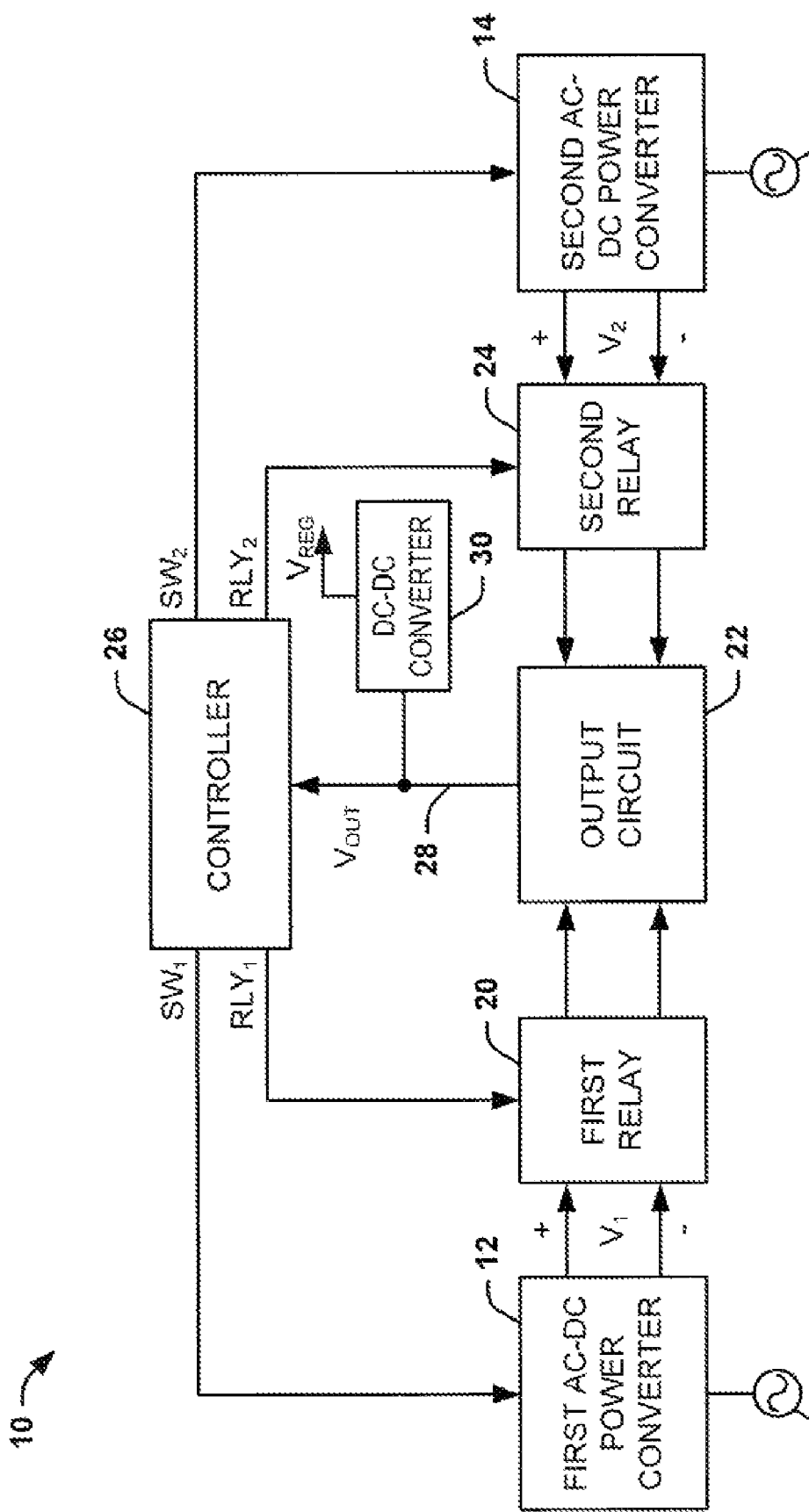
FIG. 1 illustrates an example embodiment of a redundant power supply system.

FIG. 1 illustrates an example embodiment of a redundant power supply system 10. The redundant power supply system 10 is configured to convert one or more alternating current (AC) voltage source to a direct current (DC) voltage, which can be used in any of a variety of electronic applications. As an example, the redundant power supply system 10 can be implemented to generate the DC voltage for a backplane in a computer system, such as a server. For instance, the power supply system 10 can provide the DC voltage at an output, which can be the input voltage for a DC-DC converter that is implemented to provide a regulated DC voltage for other circuitry for the computer system. Since the power supply system 10 is configured to provide redundancy, typical redundancy implemented DC-DC converters can be omitted.

In the example of FIG. 1, the redundant power supply system 10 includes a first AC-DC power converter 12 and a second AC-DC power converter 14. The first AC-DC power converter 12 is configured to convert an AC voltage generated by an AC power supply 16 to a DC output voltage $V_1$. The second AC-DC power converter 14 is configured to convert an AC voltage generated by an AC power supply 18 to a DC output voltage $V_2$. In different embodiments, the AC power supply 16 can be the same or different from the AC power supply 18. The first and second AC-DC power converters 12 and 14 can each be configured as substantially identical converters with respect to each other. As an example, each of the first and second AC-DC power converters 12 and 14 can include a bridge rectifier circuit, which can include an arrangement of diodes. The AC-DC converters 12 and 14 can also include an inductor and switch arranged as a DC boost converter.

The redundant power supply system 10 also includes a first relay 20 that interconnects the first AC-DC power converter 12 and an output circuit 22 and a second relay 24 that interconnects the second AC-DC power converter 14 and the output circuit 22. The output voltage $V_1$ and $V_2$ from each of the AC-DC converters 12 and 14 can be connected to the output circuit 22 via the respective first and second relays 20 and 24. The output circuit 22 can in turn provide an output voltage $V_{OUT}$ at the output 28, such as a backplane, based on the voltage or voltages from the first and second AC-DC converters 12 and 14. For instance, a DC-DC converter 30 can be coupled to the output 28. The DC-DC converter 30 can be configured to convert the output voltage $V_{OUT}$ to a corresponding regulated output voltage $V_{REG}$.

As an example, the first and second relays 20 and 24 can include one or more switches that can be controlled to selectively couple the first and second AC-DC power converters 12 and 14, and thus the respective output voltages $V_1$ and $V_2$, to the output circuit 22. The switches in each relay 20 and 24 can be implemented as solid state switches, semiconductor switches or the like according to application requirements. Thus, as used herein, the term "relay" is not limited to mechanical switch devices, but is intended to encompass any type of switch device that can be controlled to selectively electrically connect nodes, such as the output of the power converters 12 and 14 and the output circuit 22.

As a further example, the output circuit 22 can also include a backplane capacitor that provides filtering and energy storage of the output DC voltage $V_{OUT}$ at the output 28. The first and second AC-DC power converters 12 and 14 are considered non-isolated since they are coupled to the common output 28 via respective relays and are not isolated from each other by any other means, such as one or more transformers. For instance, when both of the relays 20 and 24 are closed, the first and second AC-DC power converters 12 and 14 share common nodes through the output circuit 22.

The redundant power supply system 10 further includes a controller 26 that is configured to control the power supply system. The controller 26 can control the first and second AC-DC power converters 12 and 14 and the first and second relays 20 and 24 to selectively provide one or both of the output voltages $V_1$ and $V_2$ to the output circuit 22. For example, the controller 26 can control the switching of the first and second AC-DC power converters 12 and 14 with respective switching signals $SW_1$ and $SW_2$ for generating the respective output voltages $V_1$ and $V_2$. The controller 26 also provides signals $RLY_1$ and $RLY_2$ to the first and second relays 20 and 24 to control respective switches to selectively couple and decouple the first and second AC-DC power converters 12 and 14 relative to the output circuit 22.

As described herein, the operation of the first and second AC-DC power converters 12 and 14 and the first and second relays 20 and 24 by the controller 26 can be implemented to mitigate the occurrence of a circulating current flow between the first and second AC-DC power converters 12 and 14. Additionally, the controller 26 can be configured to monitor an output voltage $V_{OUT}$ associated with the load in the output circuit 22 to detect a fault associated with one of the first and second AC-DC power converters 12 and 14, such as resulting from a power surge, a power loss, or a variety of other detrimental conditions. In response to detecting a fault condition, the controller 26 can control the power supply system to maintain the supply of output power to the load while also mitigating circulating current.

Figure 2:
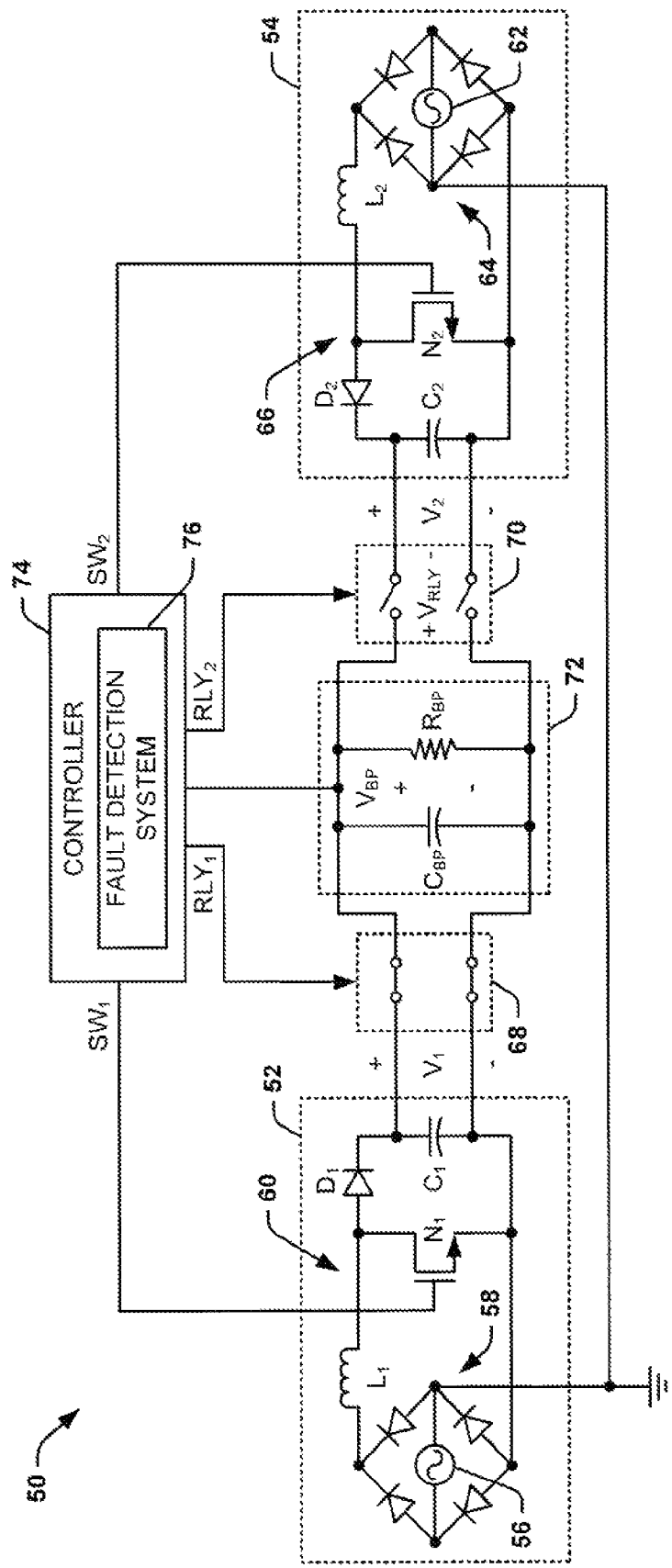
FIG. 2 illustrates another example embodiment of a redundant power supply system.

FIG. 2 illustrates another example of a redundant power supply system 50. The redundant power supply system 50 is configured to provide an output voltage, demonstrated in the example of FIG. 2 as a voltage $V_{BP}$, which is across a resistor $R_{BP}$ and parallel capacitor $C_{BP}$. As an example, the voltage $V_{BP}$ can be representative of a power backplane of a computer system.

The redundant power supply system 50 includes a first AC-DC power converter 52 and a second AC-DC power converter 54. The first AC-DC power converter 52 includes an AC power supply 56 that generates an AC voltage to a bridge rectifier 58, which can include an arrangement of four diodes configured to rectify the AC voltage from the AC power supply 56. The first AC-DC power converter 52 also includes a DC boost converter 60, which can include an arrangement of an inductor $L_1$, a switch $N_1$ (demonstrated as an N-type field effect transistor (FET)), and a diode $D_1$ that cooperate to provide a DC output voltage $V_1$ across a capacitor $C_1$.

Similarly, the second AC-DC power converter 54 includes an AC power supply 62 that generates an AC voltage to a bridge rectifier 64. The second AC-DC power converter 54 also includes a DC boost converter 66, such as formed of an arrangement of an inductor $L_2$, a switch $N_2$, and a diode $D_2$, which is configured to generate a DC output voltage $V_2$ across a capacitor $C_2$. The characteristics of the circuit components in each of the first and second AC-DC power converters 52 and 54 can be substantially the same, such that the first and second AC-DC power converters 52 and 54 can be configured substantially identical to each other.

The redundant power supply system 50 also includes a first relay 68, a second relay 70, and an output circuit 72. The first relay 68 interconnects the first AC-DC power converter 52 and the output circuit 72 and the second relay 70 interconnects the second AC-DC power converter 54 and the output circuit 72. In the example of FIG. 2, the first and second relays 68 and 70 each includes a pair of switches that can be controlled to selectively couple and decouple the first and second AC-DC power converters 52 and 54, and thus the respective output voltages $V_1$ and $V_2$, relative to the output circuit 72. The output circuit 72 includes the resistor $R_{BP}$ and output capacitor $C_{BP}$ arranged in parallel.

The first and second AC-DC power converters 52 and 54 are non-isolated because no isolation transformers are used to electrically isolate them from each other. The first and second AC-DC power converters 52 and 54 further share common output nodes across the resistor $R_{BP}$ and the output capacitor $C_{BP}$ when the switches of both of the relays 68 and 70 are closed.

The redundant power supply system 50 further includes a controller 74 that is configured to operate the first and second AC-DC power converters 52 and 54 and the first and second relays 68 and 70 to selectively provide one or both of the output voltages $V_1$ and $V_2$ to the output circuit 72. For example, the controller 74 generates a switching signal $SW_1$ to control the switching of the switch $N_1$ in the first AC-DC power converter 52 and a switching signal $SW_2$ to control the switching of the switch $N_2$ in the second AC-DC power converter 54 to control the respective output voltages $V_1$ and $V_2$. The controller 74 also generates signals $RLY_1$ and $RLY_2$ to open and close the switches of the respective first and second relays 68 and 70 to thereby couple and decouple the first and second AC-DC power converters 52 and 54 to the output circuit 72, respectively.

In the example of FIG. 2, the controller 74 is demonstrated as commanding the pair of switches of the first relay 68 to a closed condition and commanding the pair of switches of the second relay 70 to an open condition. Thus, in an initial steady state of operation, the redundant power supply system 50 can be coupled to the output circuit 72 to generate the voltage $V_{BP}$ across the resistor $R_{BP}$ based on the output voltage $V_1$ generated by the first AC-DC power converter 52. The second AC-DC power converter 54 can thus remain decoupled from the output circuit 72 to provide redundancy, such as in the event of fault or failure of the first AC-DC power converter 52.

In the example of FIG. 2, the controller 74 also includes a fault detection system 76 that is configured to monitor the voltage $V_{BP}$ across the resistor $R_{BP}$ to detect a possible fault associated with the first AC-DC power converter 52. As an example, the fault can be associated with failure of the first AC-DC power converter 52, such as from a power surge or power loss. In response to the fault detection system 76 detecting a fault, the controller 74 can be configured to decouple the first AC-DC power converter 52 and to couple the second AC-DC power converter 54 to maintain the power to the output circuit 72. Furthermore, in switching from providing power to the load from the first AC-DC power converter 52 to the second AC-DC power converter 54, the controller 74 can implement the change to mitigate a circulating current in the redundant power supply system 50.

FIGS. 3A, 3B, 3C and 3D illustrate an example of controls that can be implemented to switch a redundant power supply system. The redundant power supply system demonstrated in the example of FIG. 3 can correspond to the redundant power supply system 50 in the example of FIG. 2. Thus, reference can be made to the example of FIG. 2, and like reference numbers are used in the example of FIGS. 3A-3D as those used in the example of FIG. 2 to refer to corresponding parts in the power supply system. For ease of illustration and simplicity of explanation, the example of FIG. 3 demonstrates only the capacitors $C_1$ and $C_2$ of the first and second AC-DC power converters 52 and 54. The examples of FIGS. 3A-3D demonstrate current flow through the circuit components of the redundant power supply system 50 during the switching from the first AC-DC power converter 52 to the second AC-DC power converter 54.

Figure 3A:
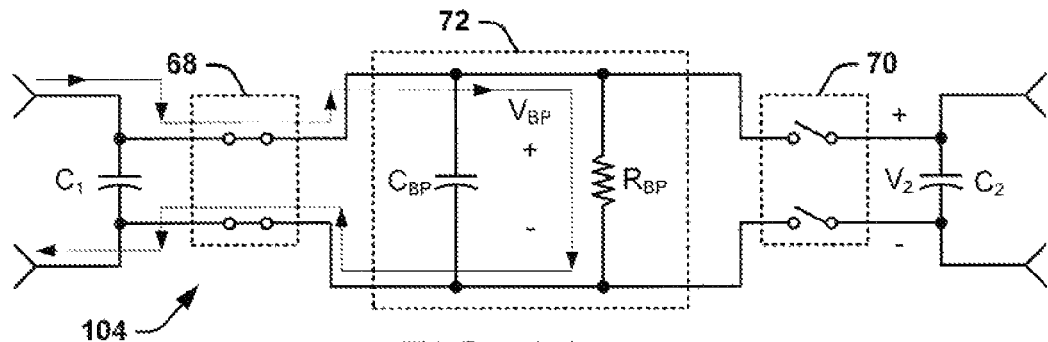
FIGS. 3A-3D illustrate an example embodiment of a redundant power supply system demonstrating current flow and switching thereof.

In FIG. 3A, the state of the power supply system 104 demonstrates the pair of switches of the first relay 68 being closed, such as when the first AC-DC power converter 52 operates in steady state to generate the voltage $V_{BP}$ across the resistor $R_{BP}$ via the output voltage $V_1$ (i.e., $V_1 = V_{BP}$). Concurrently at 104, the controller 74 can command the second AC-DC power converter 54 to generate the voltage $V_2$. The voltage $V_2$ can be generated to have a magnitude that is less than the voltage $V_{BP}$ across the resistor $R_{BP}$ while the pair of switches of the second relay 70 are open based on the signal $RLY_2$. As an example, the controller 74 can likewise monitor the magnitude of the voltage $V_2$.

Figure 3B:
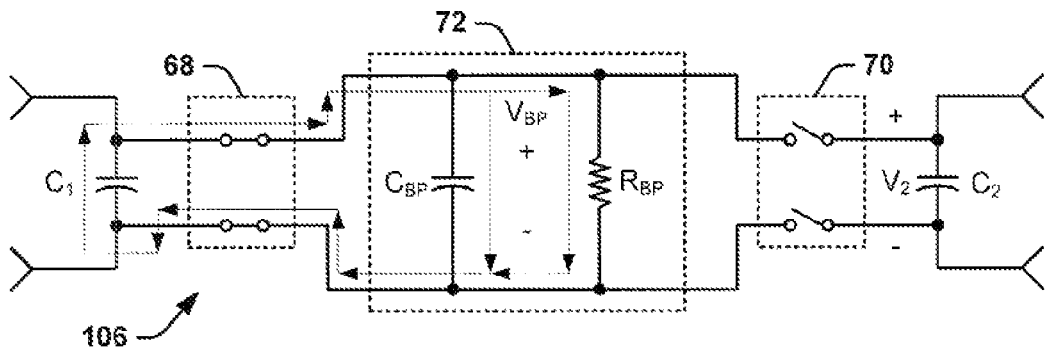

In FIG. 3B, a fault occurs in the power supply system 106, such as associated with the first AC-DC power converter 52. Thus, the capacitor $C_1$ and the output capacitor $C_{BP}$ begin to discharge to maintain power in the output circuit 72.

Figure 3C:
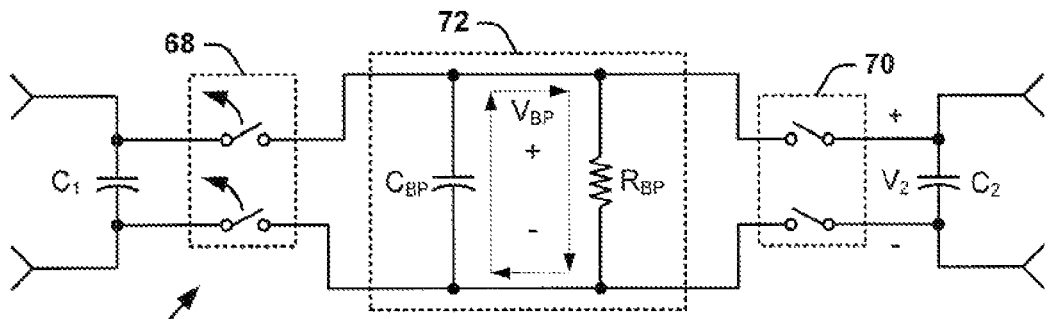

As shown in the power supply system 108 of FIG. 3C, in response to the fault being detected by the fault detection system 76, the controller decouples the first AC-DC power converter 52 from the output circuit 72 via relay signals to the pair of switches of the first relay 68. Upon the decoupling of the first AC-DC power converter 52 from the output circuit 72, the output capacitor $C_{BP}$ continues to discharge to maintain power in the output circuit 72. The magnitude of the voltage $V_{BP}$ decreases accordingly.

Figure 3D:
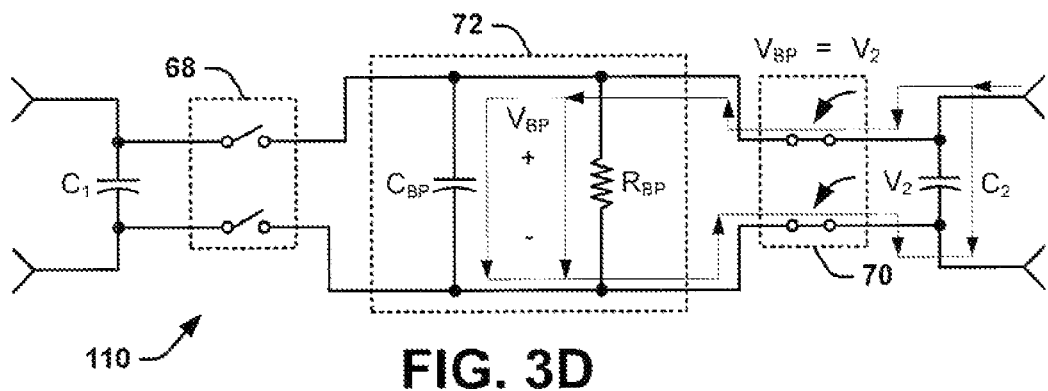

When the magnitude of the voltage $V_{BP}$ decreases to a magnitude that is approximately equal to the magnitude of the output voltage $V_2$, the controller 74 commands the pair of switches of the second relay 70 to close, as demonstrated by the power supply system 110 in FIG. 3D. In the power supply system 110, at the time of closing the pair of switches of the second relay 70, a voltage potential $V_{RLY}$ (i.e., $V_{BP}$-$V_2$) across the pair of switches of the second relay 70 is approximately zero. Thus, the controller 74 can time the closure of the switches of the second relay 70 based on the delay between the activation of the signal $RLY_2$ and the actual closure of the switches, such as based on a shorter amount of time for a solid-state relay and a longer amount of time for a mechanical relay. The zero magnitude of the voltage potential $V_{RLY}$ across the pair of switches thus substantially mitigates potential damage to the second relay 70 (e.g., due to transients) during the switching from the first AC-DC power converter 52 to the second AC-DC power converter 54. Additionally, circulating current can be mitigated. Thereafter, the controller 74 can command the second AC-DC power converter 54 to increase the magnitude of the voltage $V_2$ to build the charge in the output capacitor $C_{BP}$, and thus the voltage $V_{BP}$ across the resistor $R_{BP}$, back to a steady state magnitude. Accordingly, the redundant power supply system 50 provides redundancy to providing power to the load while substantially mitigating the occurrence of a deleterious circulating current.

It is to be understood that the redundant power supply system 50 is not intended to be limited to the examples of FIGS. 2 and 3. As an example, the redundant power supply system 50 can include multiple controllers, instead of the single controller 74, to perform all of the above described functions of the controller 74. As another example, the first and second AC-DC power converters 52 and 54 are not limited to the configuration of the bridge rectifiers 58 and 64 and the boost converters 60 and 66, but could instead include any of a variety of AC-to-DC power providing techniques to generate the DC output voltages $V_1$ and $V_2$ from an AC input power. As yet another example, the fault detection system 76 is not limited to detecting the fault associated with the first AC-DC power converter 52 based on the voltage $V_{BP}$ across the resistor $R_{BP}$, but can monitor a variety of voltages and/or currents, such as the voltage $V_1$, in the redundant power supply system 50. Furthermore, while the examples of FIGS. 2 and 3 describe a fault on the first AC-DC power converter 52 resulting in a switch to the second AC-DC power converter 54, it is to be understood that the redundant power supply system 50 can likewise operate in the opposite manner to switch from the second AC-DC power converter 54 in the steady state to the first AC-DC power converter 52. Therefore, those skilled in the art will understand appreciate various ways that the redundant power supply system 50 can be configured consistent with the teachings herein.

FIG. 4 illustrates another example embodiment of a redundant power supply system 150. The redundant power supply system 150 includes a first AC-DC power converter 152 and a second AC-DC power converter 154 that are each configured substantially the same as the first and second AC-DC power converters 52 and 54 in the example of FIG. 2. The redundant power supply system 150 can include a controller (not shown) that controls switching of the first and second AC-DC power converters 152 and 154, such as the controller 74 including the fault detection system 76 in the example of FIG. 2.

The redundant power supply system 150 also includes a first relay 156, a second relay 158, and an output circuit 160. Similar to as described above regarding the example of FIG. 2, the first relay 156 interconnects the first AC-DC power converter 152 and the output circuit 160 and the second relay 158 interconnects the second AC-DC power converter 154 and the output circuit 160. The first and second relays 156 and 158 can each be controlled by relay signals provided from the controller. The first and second AC-DC power converters 152 and 154 can thus be selectively coupled and decoupled to provide the respective output voltages $V_1$ and $V_2$ to the output circuit 160.

In the example of FIG. 4, the output circuit 160 includes the resistor $R_{BP}$ and the output capacitor $C_{BP}$ arranged in parallel, similar to the output circuit 72 in the example of FIG. 2. The output circuit 160 also includes a DC boost converter 162, such as that includes an arrangement of a capacitor $C_{BST}$, an inductor $L_3$, a switch $N_3$, and a diode $D_3$. The switch $N_3$ is demonstrated as an N-type FET that is controlled with a switching signal $SW_3$, which can be generated by the controller. Upon detecting a fault associated with the first AC-DC power converter 152 (after the first AC-DC power converter 152 has been operating in steady state), the controller can be begin operation of the boost converter 162 in the output circuit 160 by activating the switch $N_3$ according to the switching signal $SW_3$. Thus, during a detected fault condition, the capacitor $C_{BST}$ can feed the boost converter 162 and $C_{BP}$ will operates as filter capacitor for the boost converter. The two capacitors $C_{BST}$ and $C_{BP}$ are in parallel with $R_{BP}$ during normal operation.

The redundant power supply system 150 can utilize stored energy in the transition from switching between the first AC-DC power converter 152 and the second AC-DC power converter 154 to maintain the voltage $V_{BP}$ at the steady state magnitude based on the capacitor $C_{BST}$ and the operation of the boost converter 162. As a result, the voltage $V_2$ can be generated at a magnitude that is approximately equal to the magnitude of the voltage $V_{BP}$ at steady state (i.e., approximately equal to the steady state magnitude of the voltage $V_1$). In this way, the controller can couple the second AC-DC power converter 154 to the output circuit 160 substantially immediately after the first AC-DC power converter 152 is decoupled from the output circuit 160 to achieve a steady state of operation without having to subsequently increase the magnitude of the output voltage $V_2$ to a steady state magnitude while mitigating circulating current.

FIG. 5 illustrates another example embodiment of a redundant power supply system 200. The redundant power supply system 200 includes a first AC-DC power converter 202 and a second AC-DC power converter 204 that are each configured substantially the same as the first and second AC-DC power converters 52 and 54 in the example of FIG. 2. The redundant power supply system 200 can include a controller (not shown) that controls switching of the first and second AC-DC power converters 202 and 204, such as the controller 74 including the fault detection system 76 in the example of FIG. 2.

The redundant power supply system 200 also includes a first relay 206, a second relay 208, and an output circuit 210. Similar to as described above regarding the example of FIG. 2, the first relay 206 interconnects the first AC-DC power converter 202 and the output circuit 210 and the second relay 208 interconnects the second AC-DC power converter 204 and the output circuit 210. The first and second relays 206 and 208 can each be controlled by respective relay signals provided from the controller. The first and second AC-DC power converters 202 and 204 can thus be selectively coupled and decoupled to provide the respective output voltages $V_1$ and $V_2$ to the output circuit 210.

In the example of FIG. 5, the output circuit 210 includes the resistor $R_{BP}$ and the output capacitor $C_{BP}$ arranged in parallel, similar to the output circuit 72 in the example of FIG. 2. Additionally, the output circuit 210 includes a diode $D_4$ and a switch $S_1$ arranged in parallel with each other and in series with the parallel-connected output capacitor $C_{BP}$ and resistor $R_{BP}$. The switch $S_1$ can be configured as a FET device or any of a variety of other types of switch and can be controlled by the controller. During steady state operation of the first AC-DC power converter 202, the switch $S_1$ is closed, such that the redundant power supply system 200 operates substantially the same as the redundant power supply system 50 in the example of FIG. 2. In addition, the voltage $V_2$ can be generated at a magnitude that is approximately equal to the output voltage $V_{BP}$ across the resistor $R_{BP}$.

Upon detecting a fault associated with the first AC-DC power converter 202, the controller commands the switch $S_1$ to open. Because of the reverse bias of the diode $D_4$, no current flows through the output circuit 210 via a node 212 that is common to both the first and second AC-DC power converters 202 and 204. However, the output capacitor $C_{BP}$ still discharges to maintain current flow through the resistor $R_{BP}$ and provide $V_{BP}$ at its output. Since no current flows through the node 212 that is common to the first and second AC-DC power converters 202 and 204, the second AC-DC power converter 204 can be coupled to the output circuit 210 substantially instantaneously after the first AC-DC power converter 202 is decoupled from the output circuit 210 without damaging the second relay 208 or causing circulating current. After the second AC-DC power converter 204 is coupled to the output circuit 210, the switch $S_1$ can then be closed by the controller. Accordingly, the redundant power supply system 200 can achieve a steady state of operation immediately thereafter without having to subsequently increase the magnitude of the output voltage $V_2$ to a steady state magnitude.

Figure 6:
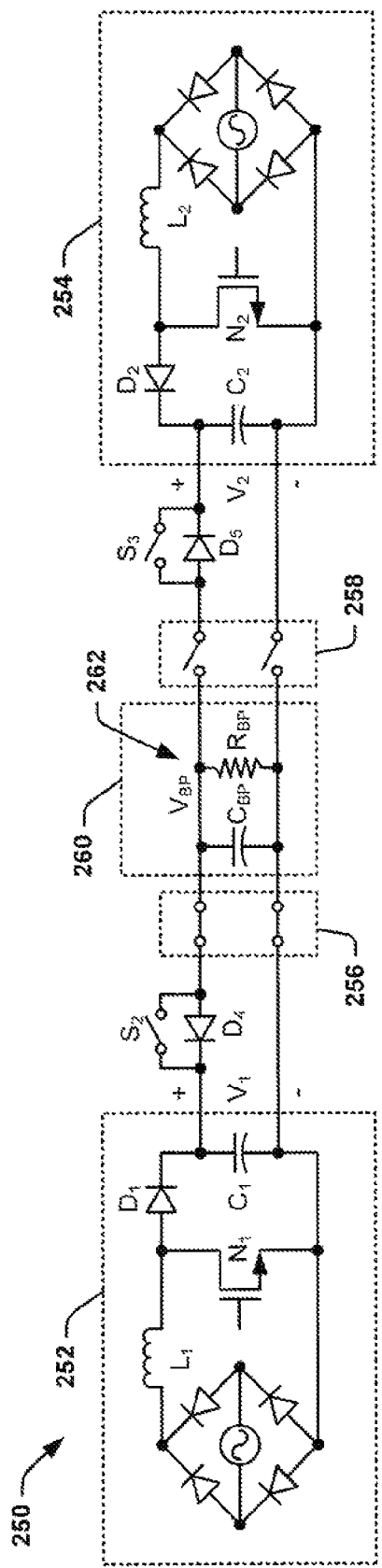
FIG. 6 illustrates another example embodiment of a redundant power supply system.

FIG. 6 illustrates another example of a redundant power supply system 250. The redundant power supply system 250 includes a first AC-DC power converter 252 and a second AC-DC power converter 254 that are each configured substantially the same as the first and second AC-DC power converters 52 and 54 in the example of FIG. 2. The redundant power supply system 250 can include a controller (not shown) that controls switching of the first and second AC-DC power converters 252 and 254, such as the controller 74 including the fault detection system 76 in the example of FIG. 2.

The redundant power supply system 250 also includes a first relay 256, a second relay 258, and an output circuit 260. Similar to as described above regarding the example of FIG. 2, the first relay 256 interconnects the first AC-DC power converter 252 and the output circuit 260 and the second relay 258 interconnects the second AC-DC power converter 254 and the output circuit 260. The first and second relays 256 and 258 can each be controlled by relay signals provided from the controller. The first and second AC-DC power converters 252 and 254 can thus be selectively coupled and decoupled to provide the respective output voltages $V_1$ and $V_2$ to the output circuit 260. In the example of FIG. 6, the output circuit 260 includes the resistor $R_{BP}$ and the output capacitor $C_{BP}$ arranged in parallel, similar to the output circuit 72 in the example of FIG. 2.

The redundant power supply system 250 also includes a diode $D_4$ and a switch $S_2$ arranged in parallel with each other between the first AC-DC power converter 252 and the first relay 256. Similarly, the redundant power supply system 250 also includes a diode $D_5$ and a switch $S_3$ arranged in parallel with each other between the second AC-DC power converter 254 and the second relay 258. The switches $S_2$ and $S_3$ can be configured as FET devices or any of a variety of other types of switch and can be controlled between on and off states by the controller. During steady state operation of the first AC-DC power converter 252, the switch $S_2$ is closed (to shunt diode $D_4$) and both the switch $S_3$ and the second relay 258 are open, such that the redundant power supply system 250 operates substantially the same as the redundant power supply system 50 in the example of FIG. 2. While the relay 258 is open, the second AC-DC power converter 254 can generate the voltage $V_2$ at a magnitude that is approximately equal to the steady state voltage $V_{BP}$ across the resistor $R_{BP}$.

Upon detecting a fault associated with the first AC-DC power converter 252, the controller commands the switch $S_2$ to open. The switches of the first relay 256 are then opened to decouple the first AC-DC power converter from the output circuit 260. As a result, because of the reverse bias of the diode $D_5$, no current flows to the output circuit 260 from the output capacitor $C_1$ in the first AC-DC power converter 252 upon the switches of the first relay 256 being opened. The output capacitor $C_{BP}$ can discharge to maintain power in the output circuit 260. The controller can then command the pair of switches of the second relay 258 to close to couple the second AC-DC power converter 254 to the output circuit 260. However, at this time, the switch $S_3$ is still open, and thus no current flows from the output capacitor $C_2$ to the output circuit 260 because of the reverse bias of the diode $D_5$. As a result, damage to the second relay 258 can be substantially mitigated when the controller commands the switches of the second relay 258 to close. After the second relay 258 has closed, the switch $S_3$ can then be closed by the controller. Accordingly, the redundant power supply system 250 can achieve a steady state of operation immediately thereafter while mitigating circulating currents and without having to subsequently increase the magnitude of the output voltage $V_2$ to a steady state magnitude.

In the example of FIG. 6, it is to be understood that the parallel arrangements of the switch $S_2$ and the diode $D_5$, as well as the switch $S_3$ and the diode $D_6$, are not limited to the "high-side" configuration in the redundant power supply system 250. As an example, the parallel arrangements can instead be located on the "low-side" of the connection between the first AC-DC power converter 252 and the first relay 256 and between the second AC-DC power converter 254 and the second relay 258, respectively. Furthermore, it is to be understood that a variety of other configurations of circuit components can be implemented to prevent current flow to the output circuit 260 from the first and second AC-DC power converters 252 and 254, similar to as demonstrated in the example of FIG. 6.

Figure 7:
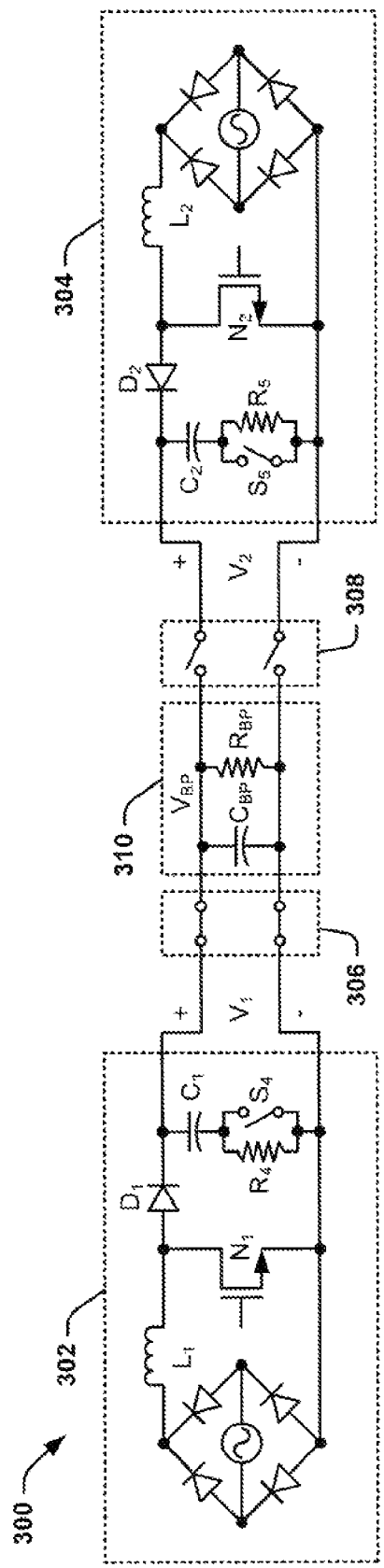
FIG. 7 illustrates another example embodiment of a redundant power supply system.

FIG. 7 illustrates another example of a redundant power supply system 300. The redundant power supply system 300 includes a first AC-DC power converter 302 and a second AC-DC power converter 304 that are each configured substantially similar to the first and second AC-DC power converters 52 and 54 in the example of FIG. 2. The redundant power supply system 300 can include a controller (not shown) that controls switching of the first and second AC-DC power converters 302 and 304, such as the controller 74 including the fault detection system 76 in the example of FIG. 2.

The redundant power supply system 300 also includes a first relay 306, a second relay 308, and an output circuit 310. Similar to as described above regarding the example of FIG. 2, the first relay 306 interconnects the first AC-DC power converter 302 and the output circuit 310 and the second relay 308 interconnects the second AC-DC power converter 304 and the output circuit 310. The first and second relays 306 and 308 can each be controlled by relay signals provided from the controller. The first and second AC-DC power converters 302 and 304 can thus be selectively coupled and decoupled to provide the respective output voltages $V_1$ and $V_2$ to the output circuit 310. In the example of FIG. 7, the output circuit 310 includes the resistor $R_{BP}$ and the output capacitor $C_{BP}$ arranged in parallel, similar to the output circuit 72 in the example of FIG. 2.

In the example of FIG. 7, the first AC-DC power converter 302 includes a resistor $R_4$ and a switch $S_4$ arranged in parallel with each other and in series with the output capacitor $C_1$. Similarly, the second AC-DC power converter 304 includes a resistor $R_5$ and a switch $S_5$ arranged in parallel with each other and in series with the output capacitor $C_2$. The switches $S_4$ and $S_5$ can be configured as FET devices or any of a variety of other types of switch and can be controlled by the controller. During steady state operation of the first AC-DC power converter 302, the switches $S_4$ and $S_5$ can be closed, such that the redundant power supply system 300 operates substantially the same as the redundant power supply system 50 in the example of FIG. 2. In addition, the voltage $V_2$ can be generated at a magnitude that is approximately equal to the voltage $V_{BP}$ across the resistor $R_{BP}$.

Upon detecting a fault associated with the first AC-DC power converter 302, the controller can command the switches $S_4$ and $S_5$ to open. As a result, the resistor $R_4$ operates to limit the current flow to the output circuit 310 from the output capacitor $C_1$. The pair of switches of the first relay 306 can then be opened to decouple the first AC-DC power converter 302 from the output circuit 310. The output capacitor $C_{BP}$ can discharge to maintain current flow through the resistor $R_{BP}$ and provide a corresponding $V_{BP}$ across the resistor $R_{BP}$. The controller can then command the pair of switches of the second relay 308 to close to couple the second AC-DC power converter 304 to the output circuit 310. However, at this time, the switch $S_5$ is still open, such that the resistor $R_5$ operates to limit the current flow to the output circuit 310 from the second AC-DC power converter 304. The resistors $R_4$ and $R_5$ can have a resistance magnitude that are configured to limit the current to magnitudes that are sufficient to substantially mitigate damage to the first and second relays 306 and 308 during the switching from the first AC-DC power converter 302 to the second AC-DC power converter 304. After the second AC-DC power converter 304 has been coupled to the output circuit 310, the switch $S_5$ can then be closed by the controller and the switch $N_2$ can begin switching again in response to the signal $SW_2$. Accordingly, the redundant power supply system 300 can achieve a steady state of operation immediately thereafter without having to subsequently increase the magnitude of the output voltage $V_2$ to a steady state magnitude.

In the example of FIG. 7, it is to be understood that the parallel arrangements of the switch $S_4$ and the resistor $R_4$, as well as the switch $S_5$ and the resistor $R_5$, are not limited to the being in series with the respective output capacitors $C_1$ and $C_2$. As an example, the parallel arrangements can instead be located between the first AC-DC power converter 302 and the first relay 306 and between the second AC-DC power converter 304 and the second relay 308, respectively. Furthermore, it is to be understood that a variety of other configurations of circuit components can be implemented to substantially limit current flow to the output circuit 310 from the first and second AC-DC power converters 302 and 304, similar to as demonstrated in the example of FIG. 7.

Figure 8:
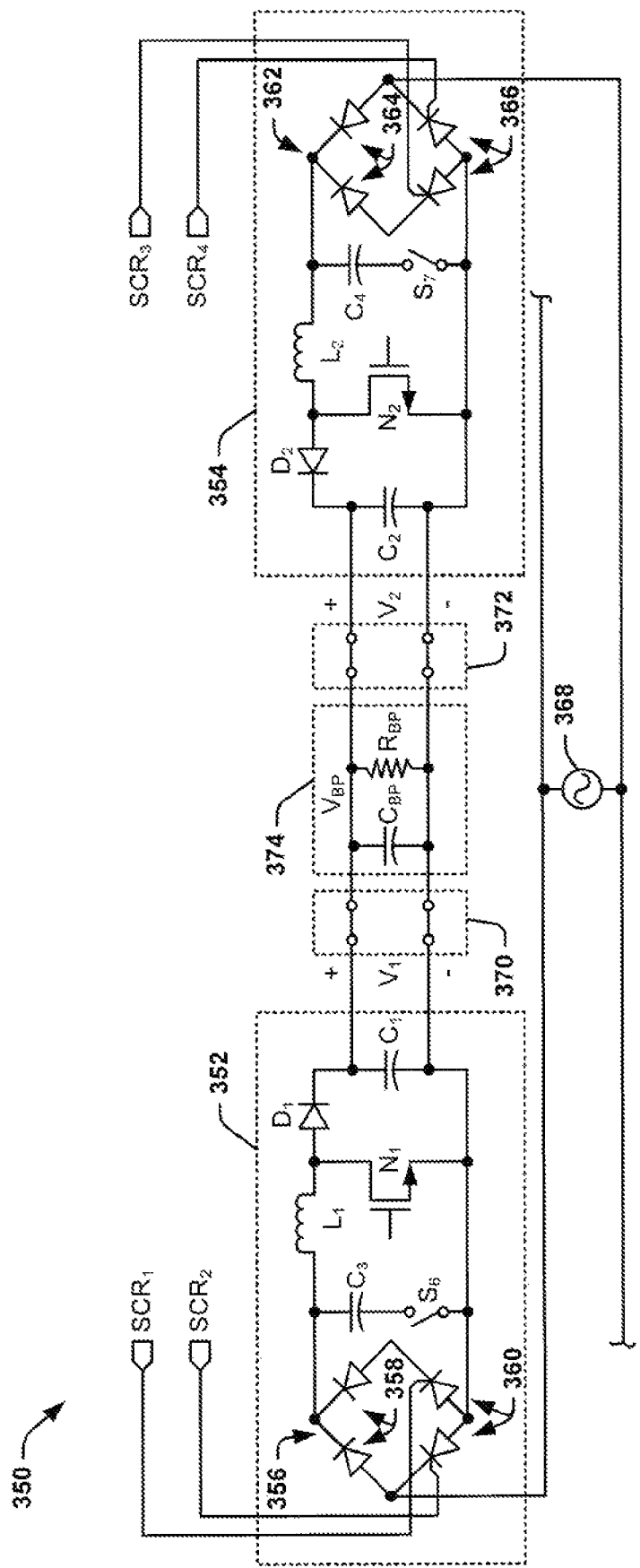
FIG. 8 illustrates another example embodiment of a redundant power supply system.

FIG. 8 illustrates another example embodiment of a redundant power supply system 350. The redundant power supply system 350 includes a first AC-DC power converter 352 and a second AC-DC power converter 354 that are each configured similar to the first and second AC-DC power converters 52 and 54 in the example of FIG. 2. The redundant power supply system 350 can include a controller (not shown) that controls switching of the first and second AC-DC power converters 352 and 354, such as the controller 74 including the fault detection system 76 in the example of FIG. 2.

In the example of FIG. 8, instead of including a four diode bridge rectifier, the first AC-DC power converter 352 includes a bridge rectifier 356 that comprises an arrangement of two diodes 358 and two silicon controlled rectifiers (SCRs) 360. The SCRs 360 receive respective activation signals $SCR_1$ and $SCR_2$ from the controller to selectively pass and prevent current flow through them. Similarly, the second AC-DC power converter 354 includes a bridge rectifier 362 that comprises an arrangement of two diodes 364 and two silicon controlled rectifiers (SCRs) 366. The SCRs 366 receive respective activation signals $SCR_3$ and $SCR_4$ from the controller to selectively pass and prevent current flow through them. It will be appreciated that this configuration of bridge rectifier can be used in any of the other examples (e.g., FIGS. 1-7) shown and described herein. Furthermore, it will also be appreciated that alternative configurations can be implemented instead of the diodes 358 and 364 and SCRs 360 and 366, such as an arrangement of four diodes and a switch in series with the common anode of two of the diodes.

In the example of FIG. 8, the first AC-DC power converter 352 also includes a series arrangement of a pre-bias capacitor $C_3$ and a switch $S_6$, and the second AC-DC power converter 354 also includes a series arrangement of a pre-bias capacitor $C_4$ and a switch $S_7$. The redundant power supply system 350 includes a common AC power supply 368, such as a three-phase power supply, which generates an AC input voltage for each of the bridge rectifiers 356 and 362. In the example of FIG. 8, separate line-to-neutral power is provided to each of the bridge rectifiers 356 and 362. For instance, a first line voltage from the AC power supply 368 is coupled as an input at one node of the rectifier 356 and the other input node for this converter is a neutral voltage. Similarly, a second and different line voltage from the AC power supply 368 is coupled as an input at one node of the second rectifier 362 and its other input node is a neutral voltage. Thus, the voltage across the AC power supply 368 corresponds to a line-to-line voltage for the system 350.

The redundant power supply system 350 also includes a first relay 370, a second relay 372, and an output circuit 374. Similar to as described above regarding the example of FIG. 2, the first relay 370 interconnects the first AC-DC power converter 352 and the output circuit 374 and the second relay 372 interconnects the second AC-DC power converter 354 and the output circuit 374. The first and second relays 370 and 372 can each be controlled by relay signals provided from the controller. The first and second AC-DC power converters 352 and 354 can thus be selectively coupled and decoupled to provide the respective output voltages $V_1$ and $V_2$ to the output circuit 374. In the example of FIG. 8, the output circuit 374 includes the resistor $R_{BP}$ and the output capacitor $C_{BP}$ arranged in parallel, similar to the output circuit 72 in the example of FIG. 2.

Some standards for redundancy in power providing applications may require that the redundancy not be dependent on the switching of a mechanical switch, such as the first and second relays 370 and 372. Therefore, in the example of FIG. 8, the redundant power supply system 350 operates in steady state with both of the sets of switches of the first and second relays 370 and 372 being closed. To achieve redundancy based on both of the sets of switches of the first and second relays 370 and 372 being closed without generating a deleterious circulating current in the redundant power supply system 350, the controller soft-starts the redundant power supply system 350 at an initial power-up stage.

To begin the soft-start, the controller initially closes the switches of the first relay 370 and opens the switches of the second relay 372. The controller also closes the switches $S_6$ and $S_7$ and provides current to bias the SCRs 360 and 366 via the respective signals $SCR_1$ and $SCR_2$ and signals $SCR_3$ and $SCR_4$. The first AC-DC power converter 352 then operates to generate the voltage $V_{BP}$ across the resistor $R_{BP}$ in the output circuit 374. Therefore, the first and second AC-DC power converters 352 and 354 generate the respective output signals $V_1$ and $V_2$ across the output capacitors $C_1$ and $C_2$. In addition, based on the coupling of the first AC-DC power converter 352 via the switches of the first relay 370, the voltage $V_{BP}$ increases across the output capacitor $C_{BP}$ and the resistor $R_{BP}$.

Upon the voltage $V_{BP}$ achieving a steady state magnitude that is greater than a peak line-to-line magnitude of the AC voltage generated by the AC power supply 368, and upon the magnitude of the output voltage $V_2$ being approximately equal to the voltage $V_{BP}$, the soft-start operation is concluded. To transition to steady state, the controller sets one of the AC-DC converters (e.g., the second AC-DC power converter 354) to an idle mode while maintaining the first AC-DC power converter 352 in the steady state to supply $V_1$ to the output $V_{BP}$. To set the second AC-DC power converter 354 to the idle mode, the controller opens the switch $S_7$, ceases the current to the SCRs 366 via the signals $SCR_3$ and $SCR_4$, and ceases operation of the switch $N_2$ at the duty-cycle of the switching signal $SW_2$. Thus, the voltage $V_2$ is maintained across the output capacitor $C_2$ at a magnitude that is approximately equal to the voltage $V_{BP}$. The controller then closes the set of switches of the second relay 372, such that the voltage potential across the set of switches of the second relay 372 is approximately zero to substantially mitigate damage to the second relay 372.

Based on the soft-start and transition to the steady state operation described above, the redundant power supply system 350 can operate in a steady state with both of the sets of switches of the first and second relays 370 and 372 closed while substantially mitigating the occurrence of a circulating current. For example, as described above, the controller closes the set of switches of the second relay 372 after the voltage $V_{BP}$ has a magnitude that is greater than a peak voltage of the AC voltage generated by the AC power supply 368. As a result, the diode $D_2$ is in a reverse bias condition, and thus cannot conduct current from the output circuit 374 into the second AC-DC power converter 354. In addition, the controller also sets the second AC-DC power converter 354 to the idle mode before closing the set of switches of the second relay 372. Therefore, the switch $S_7$ is closed and the SCRs 366 do not conduct current based on the controller ceasing to provide current to the SCRs 366 via the control signals $SCR_3$ and $SCR_4$. As a result, a circulating current cannot flow through the SCRs 366 after the set of switches of the second relay 372 close. Accordingly, the redundant power supply system 350 can provide redundant power to the load while both the first and second relays 370 and 372 are closed while substantially mitigating the occurrence of a circulating current.

In the steady state, the redundant power supply system 350 operates substantially similar to the redundant power supply system 50 in the example of FIG. 2. A fault detection system (not shown, but described herein with respect to FIGS. 1 and 2) can detect the occurrence of a fault, such as based on a power surge or power loss, in either of the first and second AC-DC power converters 352 and 354. Upon the fault being detected in the second AC-DC power converter 354, for example, the controller simply opens the switches of the second relay 372, thus allowing the first AC-DC power converter 352 to continue operating in the steady state. However, upon the fault being detected in the first AC-DC power converter 352, the controller opens the switches of the first relay 370. The controller then switches the second AC-DC power converter 354 from the idle mode to a steady state mode. For example, the controller can close the switch $S_7$, provide current to the SCRs 366 via the signals $SCR_3$ and $SCR_4$, and begin operating the switch $N_2$ at a duty-cycle according to the switching signal $SW_2$. As a result, the second AC-DC power converter 354 begins to provide power to the load in the steady state.

It is to be understood that the redundant power supply system 350 is not intended to be limited to the particular configuration shown in the example of FIG. 8. For instance, the bridge rectifiers 356 and 362 are not limited to including SCRs to selectively pass or prevent current flow, but could include any of a variety of other circuit devices instead, such as switches and/or transistors. As another example, one or both of the pre-bias capacitors $C_3$ and $C_4$ and/or associated switches $S_6$ and $S_7$ may be omitted from the respective first and second AC-DC power converters 352 and 354, such as to allow a very small circulating current, or could be replaced with other circuit components. Thus, the redundant power supply system 350 can be configured in a variety of ways. Furthermore, it is also to be understood that the features associated with one or more of the redundant power supply systems 50, 150, 200, 250, 300, and 350 in the examples of FIGS. 2, 4, 5, 6, 7, and 8 can be combined in any of a variety of ways for a given redundant power supply system.

Figure 9:
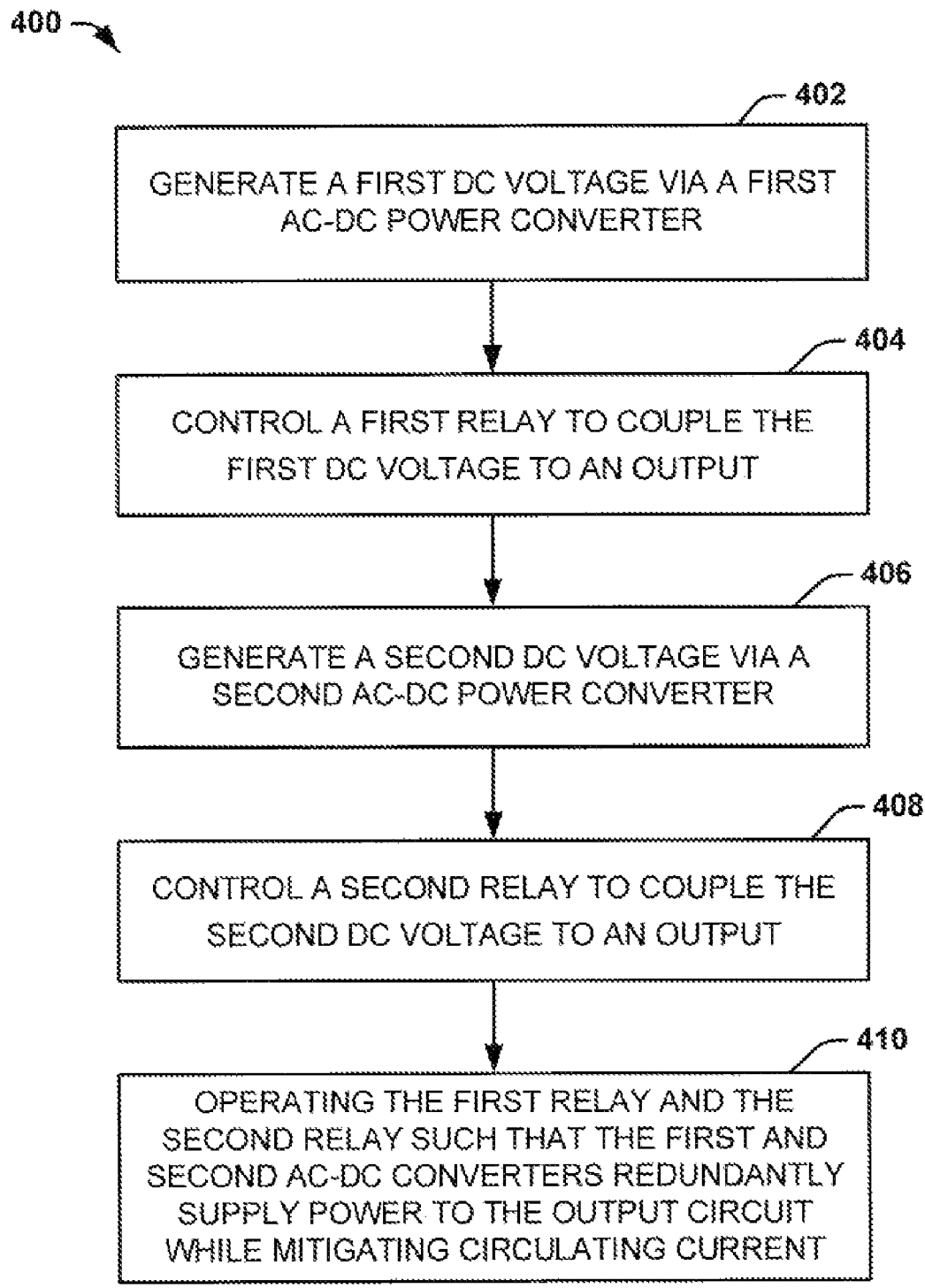
FIG. 9 illustrates an example embodiment of a method for providing power to a load in a redundant AC-DC power supply system.

In view of the foregoing structural and functional features described above, an example methodology will be better appreciated with reference to FIG. 9. While, for purposes of simplicity of explanation, the methodology of FIG. 9 is shown and described as executing serially, it is to be understood and appreciated that the present invention is not limited by the illustrated order, as some embodiments could in other embodiments occur in different orders and/or concurrently from that shown and described herein.

FIG. 9 illustrates an example embodiment of a method 400 for providing power to a load in a redundant AC-DC power supply system. The method can be implemented in the context of any of the non-isolating redundant power supply systems shown and described herein (e.g., including FIGS. 1-8). At 402, a first DC voltage is generated by a first AC-DC power converter. At 404, a first relay is operated to selectively couple the first DC voltage to an output of an output circuit. At 406, a second DC voltage is generated via a second AC-DC power converter. The first and second AC-DC power converters can be respectively coupled to the same or different AC power supplies. At 408, a second relay is controlled to selectively couple the second DC voltage to the output of the output circuit. At 410, the first relay and the second relay are operated such that at least one of the first and second AC-DC converters supply power to the output circuit while also mitigating circulating current in the redundant AC-DC power supply system.

Additionally, a fault condition associated with one of the first and second AC-DC power converters can be detected and the controls at 404 and 408 be implemented to selectively couple and decouple the respective AC-DC power converter to the output in response to detecting the fault condition to substantially mitigate circulating current in the redundant AC-DC power supply system.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A redundant AC-DC power supply system comprising:
    a first AC-DC power converter that is configured to generate a first voltage;
    a first relay that is configured to selectively couple and decouple the first voltage to an output of an output circuit;
    a second AC-DC power converter that is configured to generate a second voltage;
    a second relay that is configured to selectively couple and decouple the second voltage to the output of the output circuit; and
    a controller that is configured to operate the first and second AC-DC power converters and the first and second relays to provide redundant sources of power for the output and to mitigate circulating current flow between the first and second AC-DC power converters.

2. The system of claim 1, wherein the controller comprises a fault detector configured to detect a fault associated with at least the first AC-DC power converter, the controller being further configured to decouple the first AC-DC power converter from the output via the first relay in response to detecting the fault and to couple the second AC-DC power converter to the output via the second relay such that the second voltage approximates the voltage at the output of the output circuit when coupled thereto by the second relay.

3. The system of claim 2, wherein the second voltage is less than the first voltage, the output circuit further comprising an output capacitor configured to discharge to generate current flow through the output circuit in response to the detected fault, the controller being configured to couple the second AC-DC power converter to the output via the second relay upon the output voltage decreasing to approximately the second voltage.

4. The system of claim 2, wherein the output circuit further comprises a boost DC power converter between the first relay and the output, the controller operating the boost DC power converter in response to detecting the fault to provide current flow through the output circuit and thereby maintain the output voltage at a desired level, the second voltage also being generated at the desired level, prior to activating the second relay to couple the second AC-DC power converter to the output.

5. The system of claim 2, further comprising at least one parallel-connected diode and switch arrangement that is controlled by the fault detector as to prevent current flow from the first AC-DC power converter to the output circuit in response to detecting the fault associated with the first AC-DC power converter and prior to coupling the second AC-DC power converter to the output via the second relay.

6. The system of claim 2, further comprising at least one parallel-connected resistor and switch arrangement that is controlled by the controller to substantially limit current flow from the first AC-DC power converter to the output circuit in response to detecting the fault associated with the first AC-DC power converter and prior to coupling the second AC-DC power converter to the output circuit via the second relay.

7. The system of claim 1, wherein each of the first and second AC-DC power converters comprises a bridge rectifier, each of the bridge rectifiers comprising at least one of an arrangement of diodes and at least one controllable switch device, the system further comprising an AC power supply coupled to each of the bridge rectifiers, wherein the controller is configured to soft-start the redundant AC-DC power supply system by (i) coupling the first AC-DC power converter to the output circuit via the first relay to begin providing power to the output circuit via the first voltage, (ii) charging an output capacitor associated with the second AC-DC power converter to a magnitude that is approximately equal to a steady-state output voltage, (iii) setting the second AC-DC power converter to on idle state, and (iv) closing the second relay to couple both the first and second AC-DC power converters to the output circuit upon the steady-state voltage of the output being greater than a peak voltage associated with the AC power supply.

8. The system of claim 7, wherein the controller comprises a fault detector configured to detect a fault associated with one of the first and second AC-DC power converters,
    the controller being configured to decouple the second AC-DC power converter from the output via the second relay in response to the second AC-DC power converter being faulted, and
    the controller being configured to decouple the first AC-DC power converter from the output via the first relay and to switch the second AC-DC power converter from the idle state to a steady state in response to the first AC-DC power converter being faulted.

9. A method for providing power to an output in a redundant AC-DC power supply system, the method comprising:
    generating a first DC voltage via a first AC-DC power converter coupled to a first AC power supply;
    controlling a first relay to selectively couple the first DC voltage to an output of an output circuit;
    generating a second DC voltage via a second AC-DC power converter that is coupled to a second AC power supply, the first and second AC power supply being the same or different AC power supplies;
    controlling a second relay to selectively couple the second DC voltage to the output of the output circuit; and
    operating the first relay and the second relay such that at least one of the first and second AC-DC converters supply power to the output circuit while also mitigating circulating current in the redundant AC-DC power supply system.

10. The method of claim 9, further comprising:
    detecting a fault condition associated with one of the first and second AC-DC power converters, a given one of the first and second DC voltages associated with the one of the first and second AC-DC power converters for which the fault condition is detected is greater than the other of the first and second output voltages,
    decoupling the one of the first and second AC-DC power converters having the detected fault condition from the output via the respective one of the first and second relay;
    discharging an output capacitor to generate current flow in the output circuit during the fault condition; and
    coupling the other of the first and second power converters to the output via the respective other of the first and second relay upon an output voltage associated with the output circuit decreasing to a magnitude of the other of the first and second output voltages.

11. The method of claim 9, further comprising:
detecting a fault condition associated with one of the first and second AC-DC power converters;
decoupling the one of the first and second AC-DC power converters having the detected fault condition from the output via the respective one of the first and second relays;
operating a boost DC power converter, which interconnects the output and the one of the first and second relay associated with the respective one of the first and second AC-DC power converters having the fault condition, to maintain current flow through the output circuit; and
coupling the other of the first and second power converters to the output via the respective other of the first and second relays.

12. The method of claim 9, further comprising:
detecting a fault condition associated with one of the first and second AC-DC power converters;
opening a switch that is configured in parallel with one of a diode and a resistor to substantially mitigate current flow from the one of the first and second AC-DC power converters having the detected fault condition to the output;
decoupling the one of the first and second AC-DC power converters having the detected fault condition from the output circuit via the respective one of the first and second relays; and
coupling the other of the first and second power converters to the output circuit via the respective other of the first and second relays.

13. The method of claim 9, further comprising providing an AC input voltage to each of a first bridge rectifier of the first AC-DC power converter and a second bridge rectifier of the second AC-DC power converter, each of the first and second bridge rectifiers comprising at least one of an arrangement of diodes and at least one controllable switch device.

14. The method of claim 13, wherein the first AC power supply and the second AC power supply comprise the same AC power supply, the method further comprising:
coupling the first voltage from the first AC-DC power converter to the output via the first relay to begin providing power to the output circuit;
activating the controllable switch devices of the second bridge rectifier to charge an output capacitor of the second AC-DC power converter to a magnitude that is approximately equal to a steady-state output voltage for the output circuit;
deactivating the at least one controllable switch device of the second bridge rectifier to set the second AC-DC power converter to an idle state; and
coupling the second voltage from the second AC-DC power converter to the output upon the steady-state output voltage exceeding a peak voltage of the same AC power supply.

15. The method of claim 14, further comprising:
decoupling the first AC-DC power converter from the output via the first relay and activating the controllable switch devices of the second bridge rectifier to switch the second AC-DC power converter from the idle state to a steady state in response to detecting the fault condition associated with the first AC-DC power converter; and
decoupling the second AC-DC power converter from the output via the second relay in response to detecting the fault condition associated with the second AC-DC power converter.

* * * * *

UNITED STATES PATENT AND TRADEMARK OFFICE
CERTIFICATE OF CORRECTION

PATENT NO. : 8,395,917 B2
APPLICATION NO. : 12/817750
DATED : March 12, 2013
INVENTOR(S) : Daniel Humphrey et al.

It is certified that error appears in the above-identified patent and that said Letters Patent is hereby corrected as shown below:

In the Claims:

In column 14, line 15, in Claim 7, delete "on" and insert -- an --, therefor.

Signed and Sealed this
Twenty-third Day of July, 2013

Teresa Stanek Rea
*Acting Director of the United States Patent and Trademark Office*